United States Patent
Wallis

[11] 3,738,503
[45] June 12, 1973

[54] SAFETY OVERLOAD DEVICE FOR TRANSFER MACHINES

[76] Inventor: Bernard J. Wallis, 25200 Trowbridge Avenue, Dearborn, Mich. 48123

[22] Filed: July 29, 1971

[21] Appl. No.: 167,323

[52] U.S. Cl..................... 214/1 BB, 64/29, 198/218
[51] Int. Cl............................................. B65g 25/04
[58] Field of Search ................. 214/1 BB; 198/218; 64/28 R, 29

[56] References Cited
UNITED STATES PATENTS
3,521,761   7/1970   Wallis............................... 214/1 BB
2,656,178   10/1953   Hughes.............................. 64/28 X Primary Examiner—Robert G. Sheridan
Assistant Examiner—George F. Abraham
Attorney—Barnes, Kisselle, Raisch & Choate

[57] ABSTRACT

A safety overload device for a transfer machine having a rotatable drive member and a rotatable driven member. Overload protection is afforded by a yieldable driving connection provided between a face of the drive member and a corresponding face of the driven member by a plurality of spring-loaded bearing balls. The two members rotate over a selected angular range in unison as long as the load torque remains below a selected level as established by the spring force on the balls. A position return safety feature is provided by a pin projecting outwardly from the face of one of the two members to engage an arcuate slot in the face of the other member. The pin is positioned at one end of the slot. When the device encounters an overload during rotation in one direction, the yieldable coupling provided by the spring-loaded balls breaks the driving connection between the two members. The slot permits the drive member to continue rotating in the one direction and therefore to slip relative to the driven member so as to traverse the remaining angular distance in the one direction while the driven member remains stationary. When the drive member rotates in the opposite direction, it slips relative to the driven member until it comes to the position where it became disconnected from the driven member. As the drive member rotates through this position, the one end of the slot forcibly abuts the pin to cause the driven member to be rotated in unison with the drive member over the final increment of movement in the latter direction.

5 Claims, 4 Drawing Figures

INVENTOR
BERNARD J. WALLIS

BY
Barnes, Kisselle, Raisch & Choate
ATTORNEYS

INVENTOR
BERNARD J. WALLIS
BY
Barnes, Kisselle, Raisch & Choate
ATTORNEYS

SAFETY OVERLOAD DEVICE FOR TRANSFER MACHINES

This invention relates to safety overload devices and particularly to a safety overload device for use with a transfer mechanism of the finger bar type for indexing workpieces between stations in a press-mounted die.

In a transfer device of the aforementioned type, the drive for the workpiece-engaging finger bar is often provided by the press itself so that the finger bar cycle is correlated to the press cycle. The finger bar is extended to grip workpieces during a portion of the upstroke of the press ram. As the ram completes its upstroke and begins the next downstroke, the finger bar first advances the workpieces and then retracts out of the path of the descending ram. If for one reason or another the finger bar is not fully retracted from the extended position, it will be struck by the die on the descending ram thereby damaging both it and the die.

The primary object of the present invention is to provide a safety overload device for a transfer mechanism of the aforementioned type which disconnects the drive to the finger bar when the finger bar encounters an overload during movement thereof toward the work-gripping position and which positively retracts the finger bar from between the closing die halves after the occurrence of such an overload.

A further object of the invention is to provide a safety overload device in accordance with the preceding object which is of relatively simple construction and hence, relatively inexpensive.

Other objects and advantages of the invention will be apparent in the following description and drawings in which.

Figure 1:
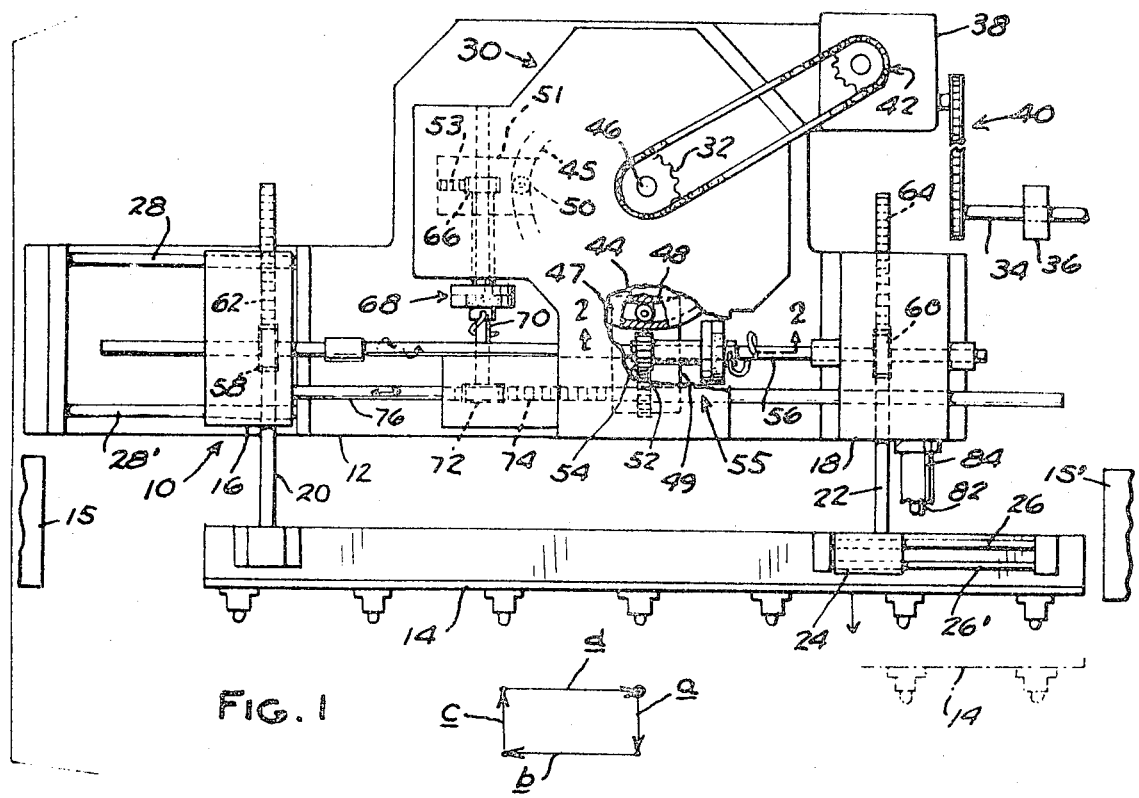
FIG. 1 is a plan view of a transfer mechanism embodying the safety overload device of the present invention and including a diagrammatic representation of a portion of the press with which the mechanism is used.

The transfer mechanism 10 in FIG. 1 comprises a base 12 on which a work-gripping finger bar 14 is supported for rectilinear movement in a rectangular path defined by arrows $a$, $b$, $c$ and $d$. Transfer device 10 is positioned alongside a press between press uprights 15 and 15' so that finger bar 14 can move toward and away from the die area of the press. Finger bar 14 is supported on a movable carriage 16 and a fixed housing 18 by means of a pair of transversely shiftable finger bar support rods 20 and 22. The attachment of rod 20 to finger bar 14 is fixed, whereas the attachment of rod 22 to finger bar 14 is through a guide block 24 on rod 22 which slidably engages a pair of guides 26 and 26' on finger bar 14. Carriage 16 is movable lengthwise of base 12 on a pair of guides 28 and 28' so that when carriage 16 is shifted lengthwise to longitudinally advance and return finger bar 14, guides 26 and 26' slide through bores in block 24.

The drive arrangement for transfer mechanism 10 is situated within a drive housing 30. As mentioned previously, the transfer mechanism is driven in timed relation with the press cycle. Any drive means so timed can be utilized. In the embodiment shown by way of example, the crankshaft of the press is utilized to drive the transfer mechanism, although it will be appreciated that other drive mechanisms independent of the press, but timed with the press cycle, may be employed. Thus, in the illustrated embodiment, an input sprocket 32 is exteriorly situated above the top surface of housing 30. Sprocket 32 is driven from the crankshaft 34 of the press with which transfer device 10 is used. Crankshaft 34 is schematically illustrated in FIG. 1 as supported by a bearing 36 on the press frame. The driving connection between crankshaft 34 and sprocket 32 is through a gear box 38 which is connected to crankshaft 34 and sprocket 32 by sprocket and chain arrangements 40 and 42. Sprocket 32 drives a cam 47 within housing 30 by means of vertical shaft 46. Cam 47 is formed with a pair of endless cam tracks 44 and 45. Cam tracks 44 and 45 embrace cam followers 48 and 50 respectively, which are disposed 90° apart about the axis of shaft 46. Followers 48 and 50 are respectively affixed to rack plates 49 and 51 having respective gear racks 52 and 53 and guided for radial movement relative to the axis of shaft 46. The construction of cam tracks 44 and 45 is such that as cam 47 is rotated by shaft 46, racks 52 and 53 are alternately shifted to produce the rectilinear motion of finger bar 14.

Rack 52 controls the transverse motion of finger bar 14 and rack 53, the longitudinal motion. Rack 52 meshes with the underside of a pinion 54 on the safety overload device 55 of the present invention. Safety overload 55 is coaxially supported on a rotary shaft 56 which extends lengthwise of base 12 through carriage 16 and housing 18. Safety overload 55 forms an operative connection between rack 52 and shaft 56 by structure hereinafter described. During normal operation, as rack 52 shifts in opposite directions, shaft 56 rotates in opposite directions. Shaft 56 in turn rotates pinions 58 and 60 within carriage 16 and housing 18 respectively, pinion 58 having a splined sliding engagement on shaft 56 as carriage 16 is shifted. Pinions 58 and 60 mesh with rack portions 62 and 64 formed in the undersides of rods 20 and 22 respectively. Hence, when rack 52 shifts radially inwardly of cam 47, fingerbar 14 is displaced in the direction of arrow $a$; when rack 52 shifts radially outwardly, finger bar 14 retracts in the direction of arrow $c$.

Rack 53 meshes with an input pinion 66 of an overload protection device 68 which is supported on a shaft 70. Shaft 70 drives a pinion 72 which meshes with a rack portion 74 on the underside of a horizontal rod 76. Rod 76 is fixedly attached to carriage 16 and axially slidable through housing 18. With this arrangement, as rack 53 shifts radially inwardly of cam 47, carriage 16 and finger bar 14 advance in the direction of arrow $b$; when rack 53 shifts radially outwardly, carriage 16 and finger bar 14 return in the direction of arrow $d$.

Finger bar 14 is horizontally aligned in a plane with a similar finger bar (not shown) on another transfer mechanism (not shown) positioned on the opposite side of the press. Two coupling shafts 82 and 84 are extended from transfer mechanism 10 to the other transfer mechanism for causing the finger bar on the other transfer mechanism to cooperate with finger bar 14 for progressively indexing workpieces (not shown) between successive stations in the press-mounted die. Shaft 84 produces motion in the longitudinal direction, while shaft 82 produces transverse motion. Shafts 82 and 84 are coupled with shaft 56 and rod 76 respectively. The two finger bars move in symmetrical fashion in unison to first grip and advance the workpieces and then retract and return.

Figure 2:
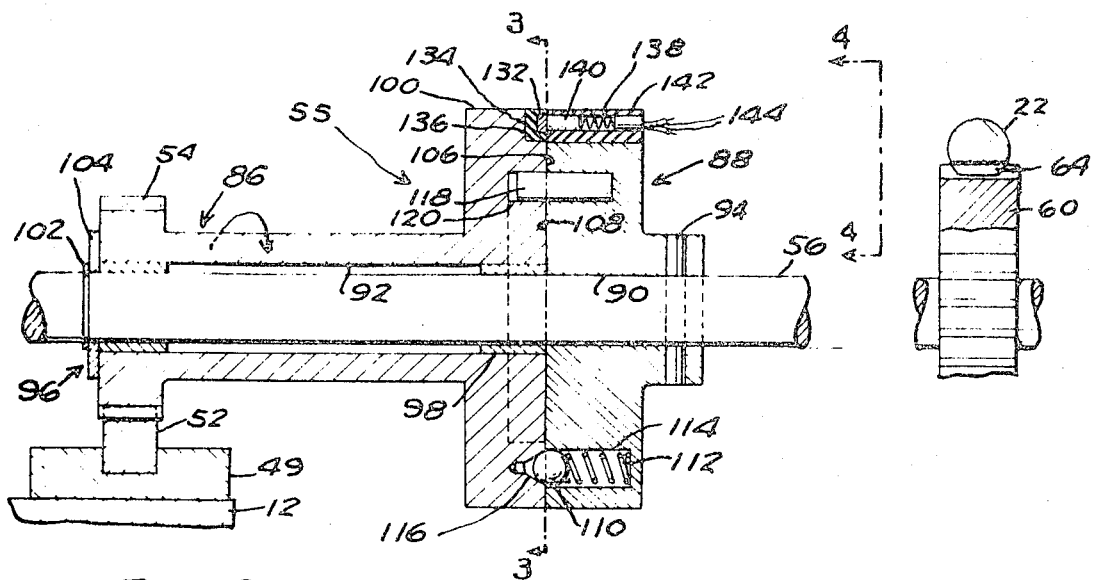
FIG. 2 is an enlarged vertical sectional view taken along line 2—2 in FIG. 1.

The structure of safety overload device 55 is more specifically described with reference to FIGS. 2 through 4. Safety overload 55 comprises an input pinion shaft, or drive member, 86 and a circular output member, or driven member, 88. Safety overload 55 is coaxially supported on shaft 56 which extends through a central bore 90 in driven member 88 and an enlarged central bore 92 in drive member 86. Driven member 88 is pinned as at 94 to shaft 56. The left-hand end of input member 86, as viewed in FIG. 2, is journalled on shaft 56 by means of a bushing 96 and its right-hand end on an axially projecting collar 98 on the left-hand end of driven member 88. Pinion 54 is integrally formed on the left-hand end of input member 86, while the right-hand end of member 86 terminates in a large circular flange plate 100. Drive member 86 is retained on shaft 56 by a retaining ring 102 and the out-turned circular flange 104 of bushing 96. This retention maintains the right-hand face 106 of flange 100 in close proximity to the left-hand face 108 of driven member 88.

A yieldable driving connection of input member 86 to output member 88 is provided between faces 106 and 108 by a plurality of three circularly-arranged bearing balls 110. Each ball 110 is preloaded by a spring 112 within a cylindrical bore 114 in driven member 88 to yieldably urge the ball into forcible engagement with an aligned chamfered circular seat 116 in flange 100 of input member 86. The force of springs 112 establishes the maximum torque which may be transmitted from drive member 86 to driven member 88. When this maximum torque is exceeded, flange 100 forces the balls out of seats 116 and into bores 114 against the force of springs 112. With balls 110 retracted into bores 114, the driving connection between input member 86 and output member 88 is broken. This permits drive member 86 to slip relative to driven member 88. With this arrangement, safety overload 55 provides overload protection.

Figure 3:
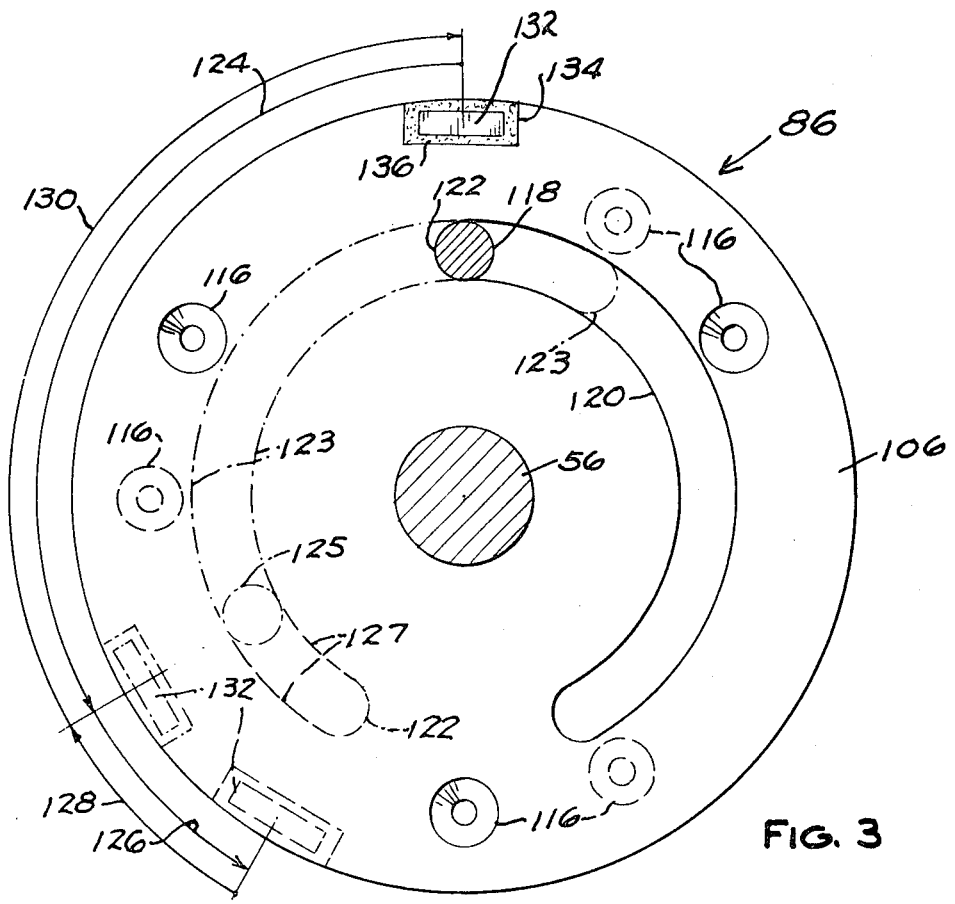
FIG. 3 is an enlarged vertical sectional view taken along line 3—3 in FIG. 2.
Figure 4:
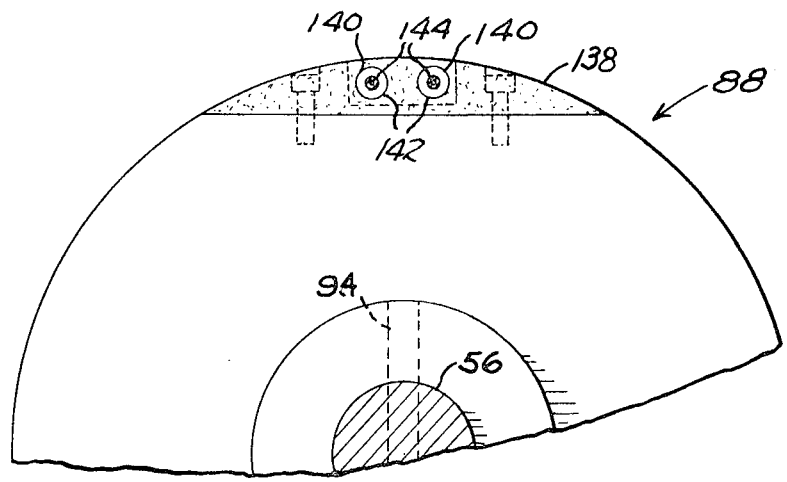
FIG. 4 is an enlarged fragmentary vertical view taken in the direction of line 4—4 in FIG. 2.

The safety aspect of safety overload 55 is provided by a round pin 118 in driven member 88 and an arcuate slot 120 in drive member 86 (FIG. 3). Pin 118 is affixed to driven member 88 so as to project perpendicularly away from face 108 at a selected radial distance from the axis of safety overload 55. Slot 120 extends arcuately about the same axis at the same radial distance therefrom and is dimensioned to receive the exposed end of pin 118. The aforementioned selected radial distance is chosen so that slot 120 does not interfere with seats 116.

When balls 110 are seated in seats 116, pin 118 is at the counterclockwise end 122 of slot 120, as indicated by solid lines in FIG. 3. Customarily, safety overload 55 rotates over a selected angular range during operation of transfer mechanism 10 to displace and retract finger bar 14. As long as no overload is encountered, drive member 86 and driven member 88 rotate in unison because of the yieldable coupling of balls 110. Hence, the position of slot 120 relative to pin 118 remains unchanged (i.e., pin 118 remains at end 122 of slot 120).

However, should an overload condition occur, balls 110 unseat from seats 116 to break the driving connection between members 86 and 88. The operation of safety overload 55 during such a situation is illustrated with particular reference to FIG. 3. For illustrative purposes, it is assumed that the angular range of rotation of safety overload 55 required to extend and retract finger bar 14 is 150°. With drive member 86 and pin 118 in the solid line positions, initial movement of drive member 86 in the counterclockwise direction is coupled through balls 110 to similarly rotate driven member 88. This counterclockwise rotation in turn begins extending finger bar 14 in the direction of arrow a. For purposes of illustration, it is also assumed that when both members 86 and 88 have rotated 120° in the counterclockwise direction as illustrated by arrow 124, an overload is encountered. At this time, finger bar 14 is almost fully extended and lies within the path of the press-mounted die. At this time, the positions of slot 120 and pin 118 are illustrated by the dot-dash lines 123 and 125 respectively in FIG. 3. Because the yieldable connection through balls 110 is now broken, drive member 86 continues to rotate a further 30° in the counterclockwise direction as illustrated by arrow 126, while driven member 88 and pin 118 (and hence finger bar 14) remain stationary. When drive member 86 is at the extreme counterclockwise limit of rotation, slot 120 assumes the position illustrated by the broken lines 127 in FIG. 3. During the first 30° of return movement of drive member 86 in the clockwise direction as illustrated by arrow 128, slot 120 moves past the still stationary pin 118. As the moving drive member 86 comes to the position where the overload occurred, balls 110 register with seats 116, and the counterclockwise end 122 of slot 120 abuts pin 118.

Absent pin 118 and slot 120, it would be possible that driven member 88 would not be recoupled to drive member 86. That is, although the force of springs 112 tends to urge balls 110 into coupling relationship with drive member 86 when the balls are in approximate registry with seats 116, the rotational speed of drive member 86 past the stationary driven member 88 may be sufficiently fast to prevent this from happening. Pin 118 and slot 120 obviate this possibility by guaranteeing that driven member 88 is always returned to its starting position by drive member 86. Therefore, upon abutment of end 122 of slot 120 with pin 118, a clockwise driving connection is positively established between drive member 86 and driven member 88. As a result of the positive return connection, finger bar 14 is fully retracted with the final 120° of clockwise rotation of driven member 88 as indicated by arrow 130. It should be noted that once slot 120 drives pin 118, the positive return driving force shifts so as to be transmitted through balls 110 rather than through pin 118 and slot 120 when balls 110 reseat in seats 116. This is because of the tendency of springs 112 to forcibly urge balls 110 into seating engagement with seats 116 once the two are in approximate registry.

From the foregoing description, it should be apparent that the length of slot 120 must be sufficient to accommodate the total angular range of travel of drive member 86. That is, should the overload occur immediately upon initial movement in the counterclockwise direction, slot 120 must be sufficiently long so that the clockwise end of slot 120 does not forcibly abut pin 118 to attempt to rotate driven member 88 in the clockwise direction. Moreover, while in the preferred embodiment, pin 118 is positioned at the counterclockwise end of slot 120 when members 86 and 88 are drivingly connected through balls 110, it should be appreciated that in some instances it may not be necessary to fully return driven member 88 to its initial position. Therefore, when the two members 86 and 88 are drivingly connected, there could be a small gap between pin 118 and the counterclockwise end of slot 120. It should also be recognized that the yieldable coupling arrangement and the safety return arrangement are independently reversible with respect to drive member 86 and driven member 88. That is, slot 120 could be in driven member 88 and pin 118 in drive member 86; and/or seats 116 could be in driven member 88 and springs 112 in bores 114 in drive member 86. For example, in a modified use of the illustrated embodiment, driven member 88 could function as the drive member and drive member 86 as the driven member; however positive return would be in the opposite direction.

An electrical contact arrangement in safety overload 55 provides an electrical signal when an overload occurs. A rectangular conductor strip 132 is supported within a recess 134 formed at the top of face 106 in flange 100 as viewed in FIG. 3. A formed electric insulator 136 supports strips 132 to maintain the front face thereof flush with face 106. An insulator block 138 is attached to the flattened top of driven member 88 as can be seen in FIG. 4. A pair of spring-loaded contacts 140 (FIGS. 2 and 3) are provided in each of two bores 142 in insulator block 138, and each is electrically connected by a corresponding external lead 144 to a control circuit (not shown). When drive member 86 is drivingly coupled to driven member 88 by means of balls 110, contacts 140 are forcibly maintained against the face of strip 132. With this arrangement, a completed circuit is formed between wires 144 through contacts 140 and strip 132. When the yieldable connection through balls 110 is broken, rotation of drive member 86 relative to driven member 88 breaks the electrical contact between the right-hand contact 140, as viewed in FIG. 4 and strip 132. Hence, the circuit between the two wires 144 is broken. This signal indicates the occurrence of an overload.

The importance of the positive return aspect of the invention can be better understood with reference to the operation of transfer mechanism 10. Because transfer mechanism 10 is operated by crank 34 of the press or some similarly timed mechanism, the position of finger bar 14 is always related to the position of the press ram. Customarily, when the ram is at the bottom of its stroke, the position of finger bar 14 is as illustrated in FIG. 1. Each of the four subsequent 90° increments of crank rotation produces one of the four rectilinear components of movement of finger bar 14. Therefore, as the crank rotates over the first two 90° increments, the press ram is upstroked and finger bar 14 moves over the paths of arrows *a* and *b*. During the latter two 90° increments of crank rotation, the press ram is downstroked and finger bar 14 moves along the paths indicated by arrows *c* and *d*.

During movement of finger bar 14 in the direction of arrow *a*, it is possible that a mislocated workpiece can jam between finger bar 14 and the die thereby overloading transfer mechanism 10. When this happens, safety overload 55 breaks the drive connection between rack 52 and finger bar 14. Further inward movement of rack 52 causes slot 120 to slip past pin 118 in the counterclockwise direction. It is assumed that the overload condition is such that the forward advance of finger bar 14 along arrow *b* is unaffected. Therefore, when the press ram begins moving downwardly during the third 90° increment of crank 34, initial outward movement of rack 52 rotates drive member 86 in the clockwise direction until the counterclockwise end 122 of slot 120 abuts pin 118. Once this happens, driven member 88 is recoupled to drive member 86 by the previously described operation of safety overload 55. Therefore, finger bar 14 is positively retracted from the path of the descending press ram. It should be mentioned that overload protection device 68 is identical to safety overload 55 except that pin 118 and slot 120 are absent because in the illustrated embodiment there is no need to positively return carriage 16 to avoid an accident between finger bar 14 and the press. Therefore, when overload protection device 68 breaks the driving connection between rack 53 and carriage 16, the electrical contact arrangement thereof provides a signal to indicate the disconnection and to turn off the press.

I claim:

1. A transfer device for advancing workpieces through a plurality of successive stations of the type having a workpiece-engaging finger bar reciprocable in one direction to transfer the workpieces between successive stations and reciprocable in a direction transverse to said one direction to a projected workpiece-engaging position and to a retracted position out of engagement with the workpieces, said device including a drive member reciprocable in opposite directions through a predetermined stroke, a driven member operably connected with the finger bar and reciprocable in opposite directions and means forming a yieldable driving connection between said drive and driven members for reciprocating said finger bar between said projected and retracted positions in response to reciprocation of said drive member through said stroke, said yieldable means being adapted to break said driving connection when the resistance to movement on the driven member exceeds a predetermined value, that improvement which comprises abutment means on said drive and driven members which are normally spaced apart when said yieldable drive means are broken, said drive member being adapted to complete its stroke in the finger bar projecting direction after said yieldable driving connection is broken while the finger bar remains in a partially projected position, said abutment means adapted to interengage and re-establish a driving connection between said drive and driven members when the drive member moves in the finger bar retracting direction to the position, relative to the driven member, where the yieldable connection was broken to thereby positively retract the finger bar to said retracted position.

2. A transfer device as called for in claim 1 wherein said abutment means comprises a slot in one of said members and a pin in the other member, said pin being movable in said slot upon relative movement of said members, said slot having an end adapted to be abutted by said pin to re-establish said driving connection between said members.

3. A transfer device as called for in claim 2 wherein said members are mounted for co-axial rotation and said slot comprises an arc struck about the axis of rotation of said members.

4. A transfer device as called for in claim 2 wherein said slot is formed on the drive member and said pin is mounted on the driven member.

5. A transfer device as called for in claim 2 wherein said pin in disposed relative to said end of said slot such that, when the pin abuts said end of said slot, said yieldable driving connection couples said members in driving relation.

* * * * *